United States Patent [19]

Dogadko

[11] Patent Number: 4,659,978
[45] Date of Patent: Apr. 21, 1987

[54] REGULATOR OVERVOLTAGE CIRCUIT
[75] Inventor: Peter Dogadko, Chicago, Ill.
[73] Assignee: Outboard Marine Corporation, Waukegan, Ill.
[21] Appl. No.: 818,193
[22] Filed: Jan. 13, 1986
[51] Int. Cl.[4] .............................................. H02J 7/14
[52] U.S. Cl. ................................. 320/71; 320/DIG. 2; 320/59; 322/91; 361/54
[58] Field of Search ....................... 322/28, 89, 90, 94, 322/91; 320/61, 57, 59, DIG. 2, 71; 361/20, 21, 54; 363/54

[56] References Cited

U.S. PATENT DOCUMENTS

| | | | |
|---|---|---|---|
| 3,456,182 | 7/1969 | Cummins et al. | 322/28 |
| 3,626,273 | 12/1971 | Pfeffer et al. | 322/28 |
| 3,723,844 | 3/1973 | Cavil | 320/71 X |
| 3,857,082 | 12/1974 | Van Opijnen | 320/25 |
| 4,177,415 | 12/1979 | Yukawa | 322/28 |
| 4,220,909 | 9/1980 | Piteo | 322/94 |
| 4,401,936 | 8/1983 | Van Opijnen | 320/59 |
| 4,405,892 | 9/1983 | Staerzl | 322/89 |
| 4,431,959 | 2/1984 | Remmers | 320/59 |
| 4,458,195 | 7/1984 | Piteo | 322/94 |

Primary Examiner—R. J. Hickey
Attorney, Agent, or Firm—Michael, Best & Friedrich

[57] ABSTRACT

Disclosed herein is a regulator circuit for regulating the charging of a battery from a source of alternating current wherein the regulator circuit includes a rectifier having first and second pairs of terminals. Alternating current, applied to the first pair of terminals, is converted to a unidirectional charge current for application to the battery through the second pair of terminals. Circuitry, responsive to the voltage at the first pair of terminals, inhibits the generation of the charge current when the voltage at the first pair of terminals reaches a predetermined threshold. Additional circuitry, also responsive to the voltage at the first pair of terminals, provides a low impedance path across the second pair of terminals. Upon the occurrence of an overvoltage condition, the production of charge current by the rectifier is inhibited and any capacitance coupled to the charge current output circuit is discharged through the low impedance path provided across the second pair of terminals.

22 Claims, 1 Drawing Figure

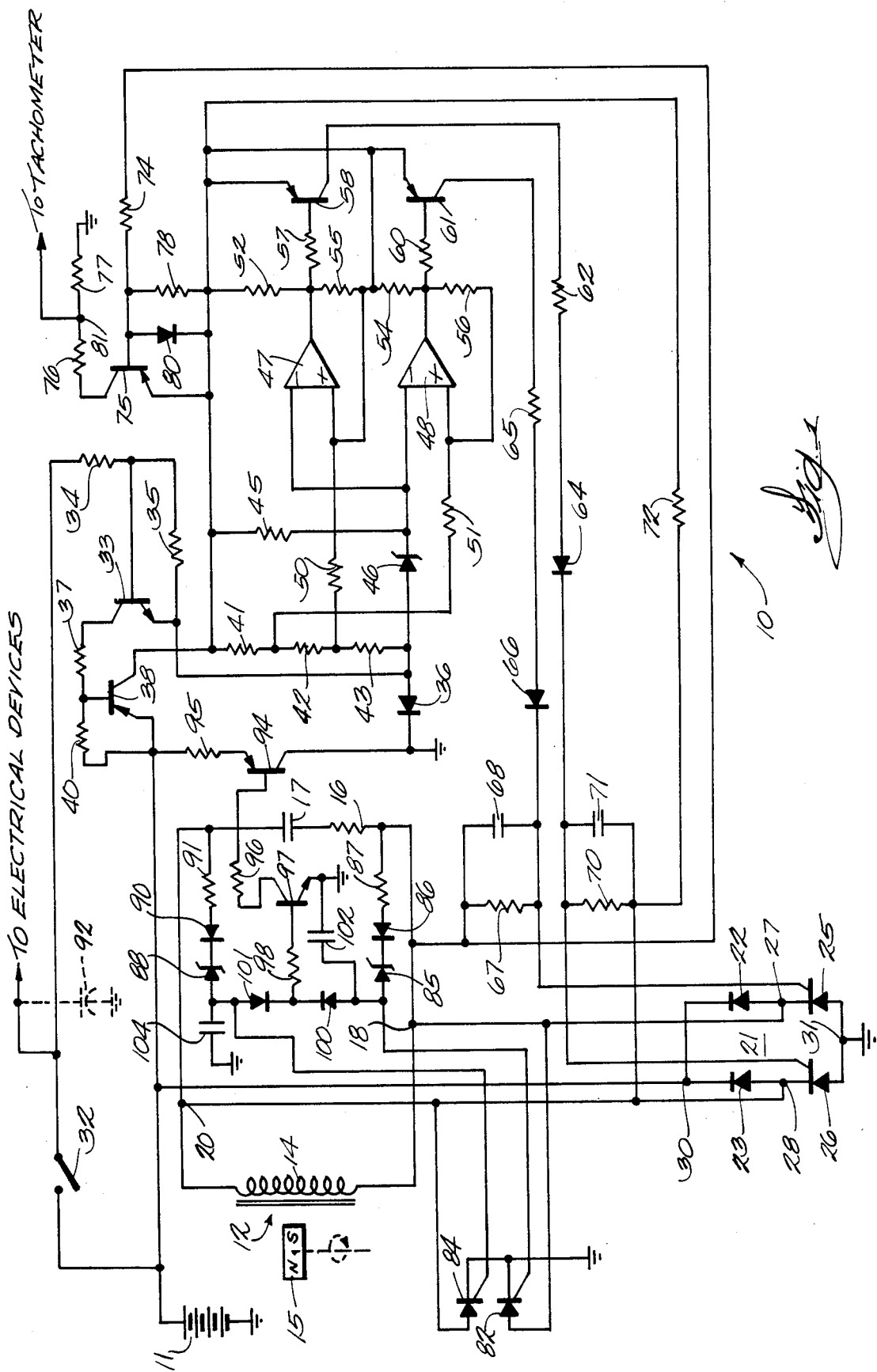

4,659,978

REGULATOR OVERVOLTAGE CIRCUIT

BACKGROUND OF THE INVENTION

This invention relates generally to regulators for regulating the charging of a battery from a source of alternating current, such as an engine-driven permanent magnet alternator, and more particularly to a regulator having voltage sensing circuitry for automatically decoupling the alternating current source in response to the occurrence of an inadvertent overvoltage condition.

Engine-driven permanent magnet alternators are widely utilized as a source of battery charging current in various engine installations typically found on boats, motorcycles and other similar vehicles. Because the output voltage developed by a permanent magnet alternator is dependent on both the engine speed and the battery charge current being drawn, fluctuations in the alternator output voltage sometimes occur as the speed of the engine, and the state of charge of the battery, vary with time.

In the event the battery to be charged is electrically disconnected from the charging system, it is not unusual for a permanent magnet alternator to provide a relatively high output voltage. Such an overvoltage condition can occur not only when the battery is deliberately removed from an operating engine installation, but also when normally occurring sulphation progresses to a point where a high resistance connection is formed at the positive polarity terminal of the battery, or when vibration causes one or more of the battery cable clamps to loosen. Since it is particularly easy for these latter conditions to occur inadvertently, voltage regulators for permanent magnet alternators frequently include voltage sensing circuitry to automatically protect against circuit damage in the event of an overvoltage condition.

In some voltage regulators, such as those shown, for example, in U.S. Pat. Nos. 4,401,936 and 4,177,415, overvoltage protection is provided by shunting the output of a permanent magnet alternator in the event the alternator output voltage rises above a pre-determined threshold. In other voltage regulators, such as that shown, for example, in U.S. Pat. No. 4,220,909, conduction between the alternator and the regulator output is inhibited when the battery is disconnected from the charging system. Other examples of voltage regulators having overvoltage protection are shown in U.S. Pat. Nos. 4,405,892, 3,857,082 and 4,458,195. Attention is also directed to U.S. Pat. Nos. 4,431,959, 3,626,273 and 3,456,182.

In voltage regulators which seek to prevent excessive voltage by shunting the connection between the alternator output and the battery, it is possible for the regulator output to remain high even after the alternator output is shunted, particularly when a relatively large filter capacitor is included in the output of the battery charging system. Under certain circumstances, this can result in undesireable partial cyclical circuit operation following removal of the battery from the charging system

SUMMARY OF THE INVENTION

The invention provides a regulator for regulating the charging of a battery from a source of alternating current comprising rectifier means having a first pair of terminals and a second pair of terminals for converting alternating current applied to the first pair of terminals to a unidirectional charge current and for applying the charge current to the battery through the second pair of terminals, first means responsive to voltage between the first pair of terminals for substantially removing the charge current from the second pair of terminals when the voltage between the first pair of terminals reaches a predetermined threshold, and second means responsive to the voltage between the first pair of terminals for providing a low impedance path between the second pair of terminals upon the voltage between the first pair of terminals reaching a predetermined threshold.

The invention also provides a regulator circuit for regulating the flow of charging current to the terminals of a battery from a source of alternating current in a battery charging system comprising rectifier means having an input and an output coupled to the source of alternating current for converting alternating current applied to the input to a unidirectional charge current and for applying the charge current to the battery through the output, control signal means coupled to the input and responsive to the voltage thereon for generating a control signal when the voltage on the input reaches a predetermined threshold, a first switch responsive to generation of the control signal and coupled to the source of alternating current for shunting the alternating current source so as to substantially remove the alternating current from the input of the rectifier and thereby substantially remove the charge current from the output upon the voltage on the input reaching the predetermined threshold, and a second switch responsive to generation of the control signal and coupled to the output for shunting the output to provide a low impedance path at the output when the voltage on the input reaches the predetermined threshold.

The invention also provides a regulator circuit for regulating the flow of charging current to the terminals of a battery from the output terminals of a source of alternating current in a battery charging system of the type wherein a capacitor is coupled to the output circuit through which the charging current is supplied to the battery comprising recitifier means having a first pair of terminals and a second pair of terminals coupled to the output terminals of the source of alternating current and operable for converting alternating current aPplied to said first pair of terminals to a unidirectional charge current and for applying the unidirectional charge current to the battery through the second pair of terminals, control signal means coupled to the first pair of terminals and responsive to the voltage therebetween for generating at least one control signal when the voltage between the first pair of terminals reaches a predetermined threshold, first shunt means responsive to generation of at least one of the control signals and coupled to the output terminals of the source of alternating current for shunting the output terminals of the alternating current source so as to substantially remove the alternating current from the first pair of terminals and thereby substantially remove the charge current from the second pair of terminals upon the voltage between the first pair of terminals reaching the predetermined threshold, and second shunt means responsive to generation of at least one of the control signals for shunting the second pair of terminals to provide a low impedance path for discharging the capacitor when the voltage between the first pair of terminals reaches the predetermined threshold.

In one embodiment the first means substantially removes the charge current from the second pair of terminals when the voltage between the first pair of terminals reaches a first predetermined threshold, the second means provides a low impedance path between the second pair of terminals when the voltage between the first pair of terminals reaches a second predetermined threshold, and the first and second predetermined thresholds are the same.

In one embodiment, the first switch comprises a thyristor having a pair of principal electrodes and a control electrode for controlling conduction between the principal electrodes. The principal electrodes are coupled to the source of alternating current and the control electrode is coupled to the control signal means. Upon application of the control signal, the thyristor operates to shunt the output of the source of alternating current. Preferably, the thyristor is a silicon controlled rectifier.

In one embodiment, the second switch includes a pair of principal electrodes and a control electrode for establishing electrical continuity between the principal electrodes upon application of the control signal to the control electrode. The principal electrodes of the switch are coupled to the second pair of terminals to provide the low impedance path between the second terminals upon application of the control signal to the control electrode. Preferably, the second switch is a transistor.

In one embodiment, a pair of silicon controlled rectifiers are provided for shunting the output of the source of alternating current in response to generation of the control signal. Each of the silicon controlled rectifiers operates on an alternate half cycle or the alternating current to substantially fully shunt the source of alernating current and thereby inhibit the application of current from the source of alternating current to the second pair of terminals in response to generation of the control signal.

It is a feature of the present invention to provide a new and improved regulator circuit for regulating the charging of a battery from a source of alternating current.

It is another feature of the present invention to provide a regulator circuit wherein protection against circuit damage in the event of an overvoltage condition is automatically provided.

It is another feature of the present invention to provide a regulator circuit wherein partial cyclical circuit operation is avoided following removal of the battery from the charging system.

How the foregoing and other more specific features of the invention are achieved will be evident in the more detailed description of a preferred embodiment of the invention which will now be set forth in reference to the drawing.

BRIEF DESCRIPTION OF THE DRAWING

FIG. 1 is a schematic diagram of a preferred embodiment of the regulator overvoltage circuit constructed in accordance with the invention.

DESCRIPTION OF THE PREFERRED EMBODIMENT

Referring to the drawing, a regulator overvoltage circuit constructed in accordance with the invention is illustrated and is generally indicated by reference numeral 10. Regulator circuit 10 functions to regulate the charging of a battery 11 from a source of alternating current which, in the embodiment illustrated, comprises an engine-driven alternator 12 such as may be utilized in an engine installation in a boat, motorcycle or similar vehicle. Alternator 12 includes an alternator stator winding 14 and an engine-driven permanent magnet rotor 15 mounted for rotation in proximity thereto. A serially connected resistor 16 and capacitor 17 are connected across output terminals 18 and 20 at either end of stator winding 14 and function as an RC filter circuit. In well known manner, an alternating current is produced at the output terminals 18 and 20 of the stator winding as rotor 15 rotates.

In addition to regulating the charging of battery 11 from alternator 12, regulator circuit 10 also functions to avoid the development of excessive voltages in the event battery 11 is disconnected while alternator 12 is operating. This is accomplished by shunting the output of alternator 12 in the event the alternator output voltage reaches a predetermined threshold. In addition, the output of the regulator circuit 10 is also shunted to assure that any capacitance which may be coupled thereto is discharged. By so discharging any such capacitance, complete shut-down of the regulator circuit 10 upon an abnormal increase in the alternator voltage is also assured.

Included in regulator circuit 10 is rectifier means for converting the alternating current to a unidirectional charge current. While various suitable means are available, in the illustrated embodiment, such rectifier means preferably comprises a full wave bridge rectifier circuit indicated generally by reference numeral 21. Bridge rectifier 21 comprises a pair of diodes 22 and 23, and a pair of silicon controlled rectifiers (SCRs) 25 and 26. The cathodes of diodes 23 and 22 are connected to one another as are the anodes of SCRs 25 and 26. The anode of diode 22 is connected to the cathode of SCR 25, while the anode of diode 23 is similarly connected to the cathode of SCR 26. A first pair of terminals 27 and 28 are formed at the junctures of diode 22 and SCR 25, and diode 23 and SCR 26, respectively, and serve as input terminals to rectifier 21. Terminals 27 and 28 are respectively connected to the output terminals 18 and 20 of stator winding 14.

Bridge rectifier 21 functions to produce a unidirectional charge current between a second pair of terminals 30 and 31, formed at the juncture of diodes 22 and 23, and SCRs 25 and 26, respectively, which serve as output terminals of the rectifier 21. Positive polarity, unidirectional charge current, developed by bridge rectifier 21, is applied to the positive polarity terminal of battery 11 through terminal 30. The negative polarity terminal of battery 11 is connected to circuit ground as is terminal 31 of bridge rectifier 21.

To permit an operator to manually enable and disable regulator circuit 10, the positive polarity terminal of battery 11 is connected to one terminal of a key switch 32 which, when closed, supplies battery power to regulator circuit 10 as well as to various electrical devices (not shown) on or within the vehicle. When closed, the battery voltage is applied to the base of an NPN transistor 33 through a series connected resistor 34. A resistor 35 is connected between the base and emitter of transistor 33. The emitter of transistor 33 is also coupled to circuit ground through a diode 36, while the collector is coupled through a resistor 37 to the base of an NPN transistor 38. The emitter of transistor 38 is coupled through resistor 40 to the base thereof, and is also connected to the positive polarity output terminal 30 of bridge rectifier 21.

Upon closure of key switch 32, transistor 33 is biased into conduction permitting the battery voltage to divide across resistors 40 and 37, and diode 36. Transistor 38 is thereby biased into conduction causing the battery voltage to appear at the collector thereof. When biased on, transistor 33 functions to assure saturation of transistor 38 despite momentary drops in the battery voltage which may occur, for example, when a heavy current demand is placed on the battery.

To control the rate at which battery 11 is charged, the collector of transistor 38 is connected to one end of a voltage divider comprising three serially connected resistors 41, 42 and 43. The remaining end of the voltage divider is coupled through diode 36 to circuit ground. The collector of transistor 38 is also connected through a resistor 45 to the cathode of a zener diode 46, the anode of which is also coupled to circuit ground through diode 36.

The cathode of zener diode 46 is connected to the inverting inputs of a pair of voltage comparators 47 and 48. The non-inverting input of comparator 47 is coupled through a resistor 50 to the juncture of resistors 42 and 43, while the non-inverting input of comparator 48 is coupled through a resistor 51 to the juncture of resistors 41 and 42. A pull-up resistor 52 is connected between the output of comparator 47 and the collector of transistor 38, while a similar pull-up resistor 54 is connected to the output of comparator 48. Hysteresis for each of the comparators is provided by resistors 55 and 56 connected between the outputs and non-inverting inputs of comparators 47 and 48, respectively.

In a manner similar to that described in U.S. Pat. No. 4,431,959 to Remmers on a Regulator for Charging A Battery With a Permanent Magnet Alternator, voltage comparators 47 and 48 function to control the charging rate of the battery in accordance with its state of charge by comparing the battery voltage against a known reference. The Zener breakdown voltage of zener diode 46 is selected so as to be less than the normal battery voltage, and current through the zener diode is limited by resistor 45. When so connected, the voltage at the cathode of the zener diode remains substantially constant at the zener breakdown voltage plus the forward bias voltage drop across diode 36. The substantially constant voltage at the zener diode cathode provides a stable reference voltage which is applied to the inverting inputs of comparators 47 and 48.

When biased into saturation, the voltage appearing at the collector of transistor 38 is substantially equal to the battery voltage and divides across resistors 41, 42 and 43. A first voltage is developed at the juncture of resistors 41 and 42 which is applied to the non-inverting input of comparator 48 through resistor 51. A second, lower, voltage, developed at the juncture of resistors 42 and 43, is applied to the non-inverting input of comparator 47 through resistor 50. In contrast to the reference voltage applied to the inverting inputs of the comparators, the first and second voltages applied to the non-inverting inputs are not constant but rather are indicative of the voltage appearing on the collector of transistor 38, and hence of the relative state of charge of the battery 11. When the voltage on the collector of transistor 38 varies in accordance with the state of charge of battery 11, first one, and then the other, of the voltages applied to the non-inverting inputs of comparators 47 and 48 will sweep across the reference voltage established at the cathode of zener diode 46. The voltage at the output of each comparator will depend upon whether the voltage at the non-inverting input is greater than or less than the reference voltage.

In the event the voltage on the collector of transistor 38 is sufficiently great as to raise both the first and second voltages above the reference voltage, the outputs of both comparators will be high. This situation corresponds to when the battery is at or near full charge. In the event the voltage on the collector of transistor 38 is great enough to place only the first, but not the second voltage above the reference voltage, the output of comparator 48 will be high, while the output of comparator 47 will be low. This situation corresponds to when the battery is partially, but not completely, discharged. In the event the voltage at the collector of transistor 38 is insufficiently great as to place neither the first, nor the second voltage above the reference potential, the output of both comparators will be low. This situation corresponds to when the battery is near fully discharged. The regulator circuit responds to the relative charge state of the battery, as indicated by the outputs of comparators 47 and 48, to effect charging at a rate most appropriate to the actual state of charge of the battery.

To this end, the output of comparator 47 is coupled through a resistor 57 to the base of a PNP transistor 58. Similarly, the output of comparator 48 is coupled through a resistor 60 to the base of another PNP transistor 61. The emitters of transistors 58 and 61 are each connected to the collector of transistor 38. The collector of transistor 58 is coupled through a serially connected resistor 62 and diode 64 to the control electrode of SCR 26. Similarly, the collector of transistor 61 is coupled through a serially connected resistor 65 and diode 66 to the control electrode of SCR 25.

When the output of comparator 47 is high, transistor 58 is biased off and the voltage on the control electrode of SCR 26 remains low. This renders SCR 26 non-conductive with the result that the half wave rectifier formed by diode 23 and SCR 26 is effectively removed from bridge rectifier 21. Similarly, when the output of comparator 48 is high, transistor 61 is biased off, causing the potential on the control electrode of SCR 25 to remain low, and causing the half wave rectifier formed by diode 22 and SCR 25 to be effectively removed from bridge rectifier 21. In the event the output of comparator 47 is low, transistor 58 is biased on, causing a positive polarity voltage to be applied to the control gate of SCR 26. SCR 26 is thereby rendered conductive and the half wave rectifier formed by diode 23 and SCR 26 becomes, once again, operational. Similarly, when the output of comparator 48 is low, transistor 61 is biased on, causing SCR 25 to once again, become conductive.

It will be apparent that the operation of bridge rectifier 21 is controlled by the output states of comparators 47 and 48, which in turn are determined by the relative charge level of the battery as indicated by the voltage appearing on the collector of transistor 38. When the battery is fully charged, the outputs of comparators 47 and 48 are both high, rendering both SCRs, 25 and 26, non-conductive. With both SCRs non-conductive, no charge current is applied to the battery. When the battery is partially discharged, the output of comparator 47 is high and the output of comparator 48 is low. Accordingly, SCR 25 is biased on while SCR 26 remains off. This causes bridge rectifier 21 to function as a half wave rectifier, and some charge current is supplied to the battery. When the battery is more fully discharged, the outputs of comparators 47 and 48 are both low, causing both SCRs, 25 and 26, to become conductive, with the further result that bridge rectifier 21 operates as a full wave rectifier. A greater charge current is thus applied to the battery.

To prevent false triggering in the presence of noise or upon the occurrence of pulsations in the voltage existing at the collector of transistor 61, a resistor 67 and capacitor 68 are connected in parallel between the cathode of diode 66 and the output terminal 18 of stator winding 14. Resistor 67 and capacitor 68 function as an RC filter and reduce susceptability to false triggering by maintaining a relatively constant voltage on the control gate of SCR 25. To prevent false triggering of SCR 26, a similar filter, comprising the parallel combination of a resistor 70 and capacitor 71, is coupled at one end through a resistor 72 to the collector of transistor 38 and is connected at the other end to the cathode of diode 64. This filter also functions to maintain a relatively constant voltage on the control gate of SCR 26 to prevent inadvertent operation in the presence of noise or momentary fluctuations in the voltage on the collector of transistor 58. Diodes 64 and 66 function to prevent the discharge of capacitors 71 and 68 through transistors 58 and 61, respectively, when the transistors are biased off.

To provide an indication of engine speed, output terminal 18 of stator winding 14 is coupled through a resistor 74 to the base of a PNP transistor 75. The emitter of transistor 75 is connected to the collector of transistor 38, while the collector of transistor 75 is coupled through serially connected resistors 76 and 77 to circuit ground. False triggering on stray noise inpulses is suppressed by means of a resistor 78 and diode 80 connected in parallel between the base and the emitter of transistor 75.

When the voltage at alternator output terminal 18 exceeds the voltage on the collector of transistor 38, transistor 75 is biased off with the result that the voltage appearing at the juncture 81 of resistors 76 and 77 drops to essentially zero. When the voltage at the alternator output terminal 18 drops below the collector voltage of transistor 38, transistor 75 is biased on causing the voltage on the collector of transistor 38 to divide across resistors 76 and 77. Accordingly, over the portion of the alternator cycle during which the alternator voltage remains below the collector voltage of transistor 38, the voltage at juncture 81 will remain high. A fixed number of voltage transitions will occur at juncture 81 upon each revolution of rotor 15 and, accordingly, an engine speed indicative signal will be produced thereon. This signal can be applied to a tachometer circuit (not shown) to provide an indication of engine revolutions.

The regulator circuit also includes means responsive to voltage between the first pair of terminals 27 and 28 of the bridge rectifier 21 for substantially removing the charge current from the second pair of terminals 30 and 31 when the voltage between terminals 27 and 28 reaches a first predetermined threshold. While a variety of means can be advantageously emplyed, in the embodiment shown, such means includes an electronic switch and preferably comprises one or more thyristor devices, such as SCRs 82 and 84. One principal electrode of SCR 82 is connected to output termianl 20 of stator winding 14, while the other principal electrode is connected to circuit ground. Similarly, the principal electrodes of SCR 84 are connected between alternator output terminal 18 and circuit ground. In each case, the cathode of SCR 82 or 84 is the principal electrode connected to circuit ground.

When an appropriate control voltage is applied to the control electrode of either SCR 82 or SCR 84, that SCR is rendered conductive and the alternator output terminal, 20 or 18, to which it is connected is shunted to circuit ground. This has the effect of substantially attenuating or removing the alternating current applied to the first pair of terminals 27 and 28 of rectifier 21, with the further effect that the unidirectional charge current appearing at the second pair of terminals 30 and 31 is substantially removed. Accordingly, SCRs 82 and 84 function as shunt means for shunting the alternator 12 to substantially remove the alternating current from rectifier 21 and thereby substantially remove the charge current from terminals 30 and 31.

To provide the control signals for controlling the conductive states of SCRs 82 and 84, control signal means, responsive to the voltage between terminals 27 and 28, are provided for generating a control signal when the voltage between terminals 27 and 28 reaches the first predetermined threshold. While a variety of means are suitable, in the embodiment shown, such means preferably includes a first zener diode 85, coupled through a serially connected diode 86 and resistor 87 to alternator output 18, and a second zener diode 88, coupled through a serially connected diode 90 and resistor 91 to alternator output terminal 20. The anode of zener diode 85 is connected to the control gate of SCR 82, while the anode of zener diode 88 is connected to the control gate of SCR 84. The cathodes of zener diodes 85 and 88 are connected to the cathodes of diodes 86 and 90 respectively.

When the voltage at either of the alternator output terminals 18 or 20 substantially exceeds the zener breakdown voltage, a positive polarity control signal is produced at the anode of the zener diode whose breakdown voltage has been exceeded. Since the zener breakdown voltages are substantially constant, as are the forward bias voltage drops across diodes 86 and 90, the control signals will be produced when the voltage across alternator output 18 and 20, and hence across rectifier terminals 27 and 28, exceeds a particular constant voltage which establishes the first predetermined threshold. Preferably, the first predetermined threshold is set above the voltages which result when the system is operating normally, and below the voltages which result when the battery is disconnected while the alternator is operating. Generation of these control signals causes SCRs 82 and 84 to become conductive with the further result that application of alternating current to rectifier 21 is terminated. While, in the embodiment shown, separate control signals are generated for controlling SCRs 82 and 84, it will be appreciated that control signal means which develop a single control signal can also be successfully employed.

As illustrated, the two SCRs 82 and 84 which function to shunt the output of alternator 12 are arranged so as to operate on alternate half cycles of the alternator output current. When both SCRs are rendered conductive, the total alternator output voltage is substantially zero.

In the event battery 11 is intentionally or inadvertently disconnected from regulator circuit 10 while alternator 12 is in operation, the alternator output voltage will tend to rise dramatically. When the voltage between alternator outputs 18 and 20 exceeds the predetermined threshold set by the breakdown voltages of zener diodes 85 and 88, the control signals will be generated causing SCRs 82 and 84 to shunt the alternator output terminals 18 and 20 and thereby substantially reduce the alternator output voltage.

Although removing the alternator output voltage from terminals 27 and 28 of bridge rectifier 21 will inhibit the further production of unidirectional charge current at rectifier output terminal 30, the voltage at terminal 30 may nevertheless remain above ground potential, particularly if a substantial capacitance is coupled to the battery charge current output circuitry. Such a capacitance, which may, for example, constitute a filter capacitor within a radio unit making up one of the "electrical devices" powered by battery 11 and regulator circuit 10, is illustrated in phantom in the figure, and is identified by reference numeral 92. When charged, capacitor 92 tends to maintain the positive polarity voltage on rectifier output terminal 30 and, provided key switch 32 remains closed, on the collector of transistor 38. Accordingly, regulator circuit 10 tends to remain operational until capacitor 92 becomes substantially discharged. If the period required for capacitor 92 to discharge is longer than the period of each cycle of the alternator output voltage, partial unidirectional current pulses will continue to be developed at output terminal 30 of rectifier 21 over the portion of each cycle which is below the first predetermined threshold voltage. If the current thus produced is sufficient to maintain the charge on capacitor 92, the cycle will be repeated and the regulator will remain in such a semi-operational state indefinitely.

To avoid such operation, means responsive to the voltage between the first pair of terminals 27 and 28 of rectifier 21 is included for providing a low impedence path between the second pair of terminals 30 and 31 when the voltage between the first pair of terminals exceeds a second Predetermined threshold. Preferably, the first and second predetermined thresholds are the same, although it will be appreciated that dissimilar thresholds can be used. While a variety of means are suitable, in the embodiment shown, such means includes an electronic switch which preferably comprises a PNP transistor 94 having its collector connected to circuit ground and having its emitter coupled through a resistor 95 to rectifier output terminal 30. The base of transistor 94 is coupled through a resistor 96 to the collector of an NPN transistor 97 having its emitter connected to circuit ground. The base of transistor 97 is coupled through a resistor 98 to the juncture of the cathodes of a pair of diodes 100 and 101. The anodes of diodes 100 and 101 are connected to the anodes of zener diodes 85 and 88 respectively.

When the voltage between the output terminals 18 and 20 of alternator 12 exceeds the first and second predetermined thresholds (which in the embodiment illustrated are the same), the control signals generated at the anodes of zener diodes 85 and 88 are coupled through diodes 100 and 101, respectively, and through resistor 98, to the base of transistor 97 thereby causing transistor 97 to become conductive. When transistor 97 is so biased, transistor 94 becomes conductive and the end of resistor 95 connected thereto is effectively coupled to circuit ground. This has the effect of placing resistor 95 across output terminals 30 and 31 of rectifier 21, with the further result that a low impedance discharge path is provided for capacitor 92. Accordingly, transistor 94 and resistor 95 function as shunt means for shunting the second pair of terminals 30 and 31 of the rectifier 21 when the predetermined threshold is exceeded. Again, it will be appreciated that a single control signal can be provided for simultaneously controlling the conductive states of SCRs 82 and 84, and transistor 97.

The resistance of resistor 95 is selected such that the discharge period of capacitor 92 is substantially less than the period of each cycle of the alternating current produced by alternator 12. This assures that capacitor 92 is substantially fully discharged before a subsequent unidirectional current pulse can be produced at output 30 of the rectifier. Because the voltage remaining on output terminal 30 drops substantially when transistor 94 is rendered conductive, the remainder of the regulator circuitry is disabled and, since the control voltages required to bias SCRs 25 and 26 on can now no longer be generated, no additional unidirectional current pulses will be developed at output terminal 30 during subsequent cycles of the alternator output current. The circuit will remain inactive until such time as the battery is once again connected. To avoid false triggering in the presence of noise or other transient voltage impulses, filter capacitors 102 and 104 are coupled between the anodes of diodes 100 and 101, respectively, and circuit ground.

Although a preferred embodiment of the invention has been described in considerable detail, such description is intended to be illustrative rather than limiting, for the invention may be variously embodied and is to be limited only by interpretation of the claims which follow.

I claim:

1. A regulator for regulating the charging of a battery from a source of alternating current, said regulator comprising rectifier means having a first pair of terminals and a second pair of terminals and operable for converting alternating current applied to said first pair of terminals to a unidirectional charge current and for applying the charge current to the battery through said second pair of terminals, first means responsive to voltage between said first pair of terminals for substantially removing the charge current from said second pair of terminals when the voltage between said first pair of terminals reaches a predetermined threshold, and second means responsive to the voltage between said first pair of terminals for providing a low impedance path between said second pair of terminals upon the voltage between said first pair of terminals reaching a predetermined threshold.

2. A regulator as defined in claim 1 wherein said first means substantially removes the charge current from said second pair of terminals when the voltage between said first pair of terminals reaches a first predetermined threshold, said second means provides a low impedance path between said second pair of terminals when the voltage between said first pair of terminals reaches a second predetermined threshold, and the first and second predetermined thresholds are the same.

3. A regulator as defined in claim 2 wherein said second means include shunt means for shunting said second pair of terminals to provide said low impedance path upon voltage between said first pair of terminals reaching the first predetermined threshold.

4. A regulator as defined in claim 2 wherein at least one of said second pair of terminals is coupled to a capacitor and said shunt means function to substantially discharge the capacitor through said low impedance path upon the voltage between said first pair of terminals reaching the first predetermined threshold.

5. A regulator as defined in claim 4 wherein said first and second means include control signal means responsive to the voltage between said first pair of terminals for generating a control signal when the voltage between said first pair of terminals reaches the first predetermined threshold.

6. A regulator as defined in claim 5 wherein said shunt means comprise a switch having a pair of principal electrodes and having a control electrode for establishing electrical continuity between said principal electrodes upon application of the control signal to said control electrode, said principal electrodes being coupled to said second pair of terminals and said control electrode being coupled to said control signal means.

7. A regulator as defined in claim 6 wherein said switch comprises a transistor.

8. A regulator as defined in claim 5 wherein said first means include additional shunt means for shunting the source of alternating current so as to substantially remove the alternating current from said rectifier means and thereby substantially remove the charge current from said second pair of terminals.

9. A regulator as defined in claim 8 wherein said additional shunt means include a thyristor having principal electrodes coupled to the source of alternating current and having a control electrode coupled to said control signal means, said thyristor functioning to shunt the source of alternating current upon generation of the control signal.

10. A regulator as defined in claim 9 wherein said thyristor is a silicon controlled rectifier.

11. A regulator as defined in claim 10 wherein said additional shunt means include a pair of said silicon controlled rectifiers operating on alternate half cycles of the alternating current to shunt the source of alternating current in response to generation of the control signal.

12. A regulator circuit for regulating the flow of charging current to the terminals of a battery from of a source of alternating current in a battery charging system, said regulator circuit comprising rectifier means having an input and an output coupled to the source of alternating current and operable for converting alternating current applied to said input to a unidirectional charge current and for applying the charge current to the battery through said output, control signal means coupled to said input and responsive to the voltage thereon for generating a control signal when the voltage on said input reaches a predetermined threshold, a first switch responsive to generation of the control signal coupled to the source of alternating current and operable for shunting the alternating current source so as to substantially remove the alternating current from said input of said rectifier and thereby substantially remove the charge current from said output upon the voltage on said input reaching the predetermined threshold, and a second switch responsive to generation of the control signal and coupled to said output for shunting said output to provide a low impedance path at said output when the voltage on said input reaches the predetermined threshold.

13. A regulator circuit as defined in claim 12 wherein said output is coupled to a capacitor and said capacitor is substantially discharged through the low impedance path when the voltage on said input reaches the predetermined threshold.

14. A regulator circuit as defined in claim 13 wherein said second switch includes a pair of principal electrodes and a control electrode for establishing electrical continuity between said principal electrodes upon application of the control signal to said control electrode, one of said principal electrodes being coupled to said output and said control electrode being coupled to said control signal means.

15. A regulator circuit as defined in claim 14 wherein said second switch comprises a transistor.

16. A regulator circuit as defined in claim 15 wherein the source of alternating current is a permanent magnet alternator.

17. A regulator circuit for regulating the flow of charging current to the terminals of a battery from the output terminals of a source of alternating current in a battery charging system of the type wherein a capacitor is coupled to the output circuit through which the charging current is supplied to the battery, said regulator circuit comprising recitifier means having a first pair of terminals and a second pair of terminals coupled to the output terminals of the source of alternating current and operable for converting alternating current applied to said first pair of terminals to a unidirectional charge current and for applying the unidirectional charge current to the battery through said second pair of terminals, control signal means coupled to said first pair of terminals and responsive to the voltage therebetween for generating at least one control signal when the voltage between said first pair of terminals reaches a predetermined threshold, first shunt means responsive to generation of at least one of the control signals and coupled to the output terminals of the source of alternating current and operable for shunting the output terminals of the alternating current source so as to substantially remove the alternating current from said first pair of terminals and thereby substantially remove the charge current from said second pair of terminals upon the voltage between said first pair of terminals reaching the predetermined threshold, and second shunt means responsive to generation of at least one of the control signals for shunting said second pair of terminals to provide a low impedance path for discharging the capacitor when the voltage between said first pair of terminals reaches the predetermined threshold.

18. A regulator circuit as defined in claim 17 wherein said second shunt means comprise a switch having a pair of principal electrodes and a control electrode for establishing electrical continuity between said principal electrodes upon application of one of the control signals to said control electrode, said principal electrodes being coupled to said second pair of terminals and said control electrode being coupled to said control signal means.

19. A regulator circuit as defined in claim 18 wherein said switch comprises a transistor.

20. A regulator circuit as defined in claim 19 wherein said first shunt means include a thyristor having principal electrodes coupled to the source of alternating current and having a control electrode coupled to said control signal means, said thyristor functioning to at least partially shunt the source of alternating current upon generation of at least one of the control signals.

21. A regulator circuit as defined in claim 20 wherein said thyristor is a silicon controlled rectifier.

22. A regulator circuit as defined in claim 21 wherein the source of alternating current is a permanent magnet alternator.

* * * * *